US009217066B2

(12) United States Patent
Zaluzec et al.

(10) Patent No.: US 9,217,066 B2
(45) Date of Patent: Dec. 22, 2015

(54) STRUCTURAL POLYMER INSERT AND METHOD OF MAKING THE SAME

(75) Inventors: Matthew John Zaluzec, Canton, MI (US); Larry P. Haack, Ann Arbor, MI (US); Ann Marie Straccia, Southgate, MI (US); Kazuhisa To, Novi, MI (US)

(73) Assignees: Ford Global Technologies, LLC, Dearborn, MI (US); Mazda Motor Corporation, Hiroshima (JP)

( * ) Notice: Subject to any disclaimer, the term of this patent is extended or adjusted under 35 U.S.C. 154(b) by 1387 days.

(21) Appl. No.: 12/059,230

(22) Filed: Mar. 31, 2008

(65) Prior Publication Data

US 2009/0246506 A1   Oct. 1, 2009

(51) Int. Cl.
B32B 7/12 (2006.01)
C08J 7/12 (2006.01)
C08J 7/04 (2006.01)

(52) U.S. Cl.
CPC *C08J 7/123* (2013.01); *C08J 7/047* (2013.01); C08J 2323/12 (2013.01); C08J 2463/00 (2013.01); Y10T 428/249984 (2015.04); Y10T 428/269 (2015.01); Y10T 428/28 (2015.01)

(58) Field of Classification Search
None
See application file for complete search history.

(56) References Cited

U.S. PATENT DOCUMENTS

| 3,654,219 | A |   | 4/1972  | Boyer et al.       |         |
|-----------|---|---|---------|--------------------|---------|
| 3,705,222 | A |   | 12/1972 | Rogers et al.      |         |
| 3,864,181 | A | * | 2/1975  | Wolinski et al.    | 156/79  |
| 5,225,140 | A | * | 7/1993  | Hayashikoshi et al.| 264/571 |
| 5,240,973 | A | * | 8/1993  | Katoh et al.       | 522/73  |
| 5,415,819 | A | * | 5/1995  | Tisack             | 264/483 |
| 5,466,424 | A | * | 11/1995 | Kusano et al.      | 422/186.05 |
| 5,702,772 | A | * | 12/1997 | Skelly et al.      | 427/536 |
| 6,739,673 | B2|   | 5/2004  | Gupta et al.       |         |
| 7,066,532 | B2|   | 6/2006  | Schoemann          |         |
| 7,108,312 | B2|   | 9/2006  | Cowelchuk et al.   |         |
| 7,128,373 | B2|   | 10/2006 | Kurtycz et al.     |         |
| 7,156,437 | B2|   | 1/2007  | Cowelchuk et al.   |         |
| 7,250,091 | B2|   | 7/2007  | Gupta et al.       |         |
| 2003/0116281 | A1| * | 6/2003 | Herbert et al.    | 156/379.6 |
| 2004/0188885 | A1| * | 9/2004 | Lorenzo et al.    | 264/328.1 |
| 2004/0194877 | A1| * | 10/2004 | Gupta et al.     | 156/242 |
| 2007/0065582 | A1|  | 3/2007 | Haack et al.      |         |
| 2007/0114816 | A1|  | 5/2007 | Hoelzel et al.    |         |
| 2007/0176475 | A1|  | 8/2007 | Nakhla et al.     |         |
| 2008/0003436 | A1|  | 1/2008 | Haack et al.      |         |
| 2013/0149472 | A1| * | 6/2013 | Holubka et al.   | 428/31  |

FOREIGN PATENT DOCUMENTS

| GB | 2182041 A | 5/1987 |
| JP | 61252159 A | 11/1986 |
| JP | 62106064 | 5/1987 |
| JP | 0825483 | 1/1996 |
| WO | 0125055 A1 | 4/2001 |
| WO | WO 2007025036 A1 * | 3/2007 | ............ C08J 9/00 |

OTHER PUBLICATIONS

Ebnesajjad, Sina (2006). Surface Treatment of Materials for Adhesion Bonding. (pp. 128-130). William Andrew Publishing.Online version available at:http://www.knovel.com/web/portal/browse/display?_EXT_KNOVEL_DISPLAY_bookid=1431&VerticalID=0.*
Luigi Carrino, Giovanni Moroni, Wilma Polini, Cold plasma treatment of polypropylene surface: a study on wettability and adhesion, Journal of Materials Processing Technology, vol. 121, Issues 2-3, Feb. 28, 2002, pp. 373-382, ISSN 0924-0136, DOI: 10.1016/S0924-0136(01)01221-3. (http://www.sciencedirect.com/science/article/B6TGJ-44SKDX3-4/2/ad.*
M. Strobel et al., "Plasma Surface Modification of Polymers: Relevance to Adhesion", 1994, VSP BV, section 2.2.2.2.*
J. Karger-Kocsis, "Polypropylene An A-Z Reference", 1999, Kluwer Academic Publishers, pp. 794-799.*
Donald, M. Mattox, "Handbook of Physical Vapor Deposition (PVD) Processing", 1998, Noyes Publications, Chapter 11, pp. 616-618.*
"What is the definition of mechanical bonding" from Adhesives Training Basis of the Bonding Process 120, retrived on Oct. 9, 2013.*
Walzak et al., UV and ozone treatment of polypropylene and poly-(ethylene terephthalate); Jounral of Adhesion Science and Technology, vol. 9, No. 9; pp. 1229-1248 (1995).
Chinese second Office Action, Chinese Patent Application No. 200910130694., dated Jun. 19, 2013.
Notice of Reasons for Rejections from JPO on related application to 81170125.

* cited by examiner

*Primary Examiner* — Hai Vo
*Assistant Examiner* — Anish Desai
(74) *Attorney, Agent, or Firm* — Damian Porcari; Brooks Kushman P.C.

(57) ABSTRACT

A structural polymer insert. The insert includes a substrate having a surface and an adhesive with the substrate being an admixture of a polypropylene component and a glass fiber component. The surface has a plurality of oxygen atoms, optionally introduced by air plasma, in an amount of 1 to 60 atomic percent of all the atoms present on the surface. The foam adhesive is attached to the surface through one or more reactive moieties resulted from oxidative action of the oxygen atoms.

10 Claims, 12 Drawing Sheets

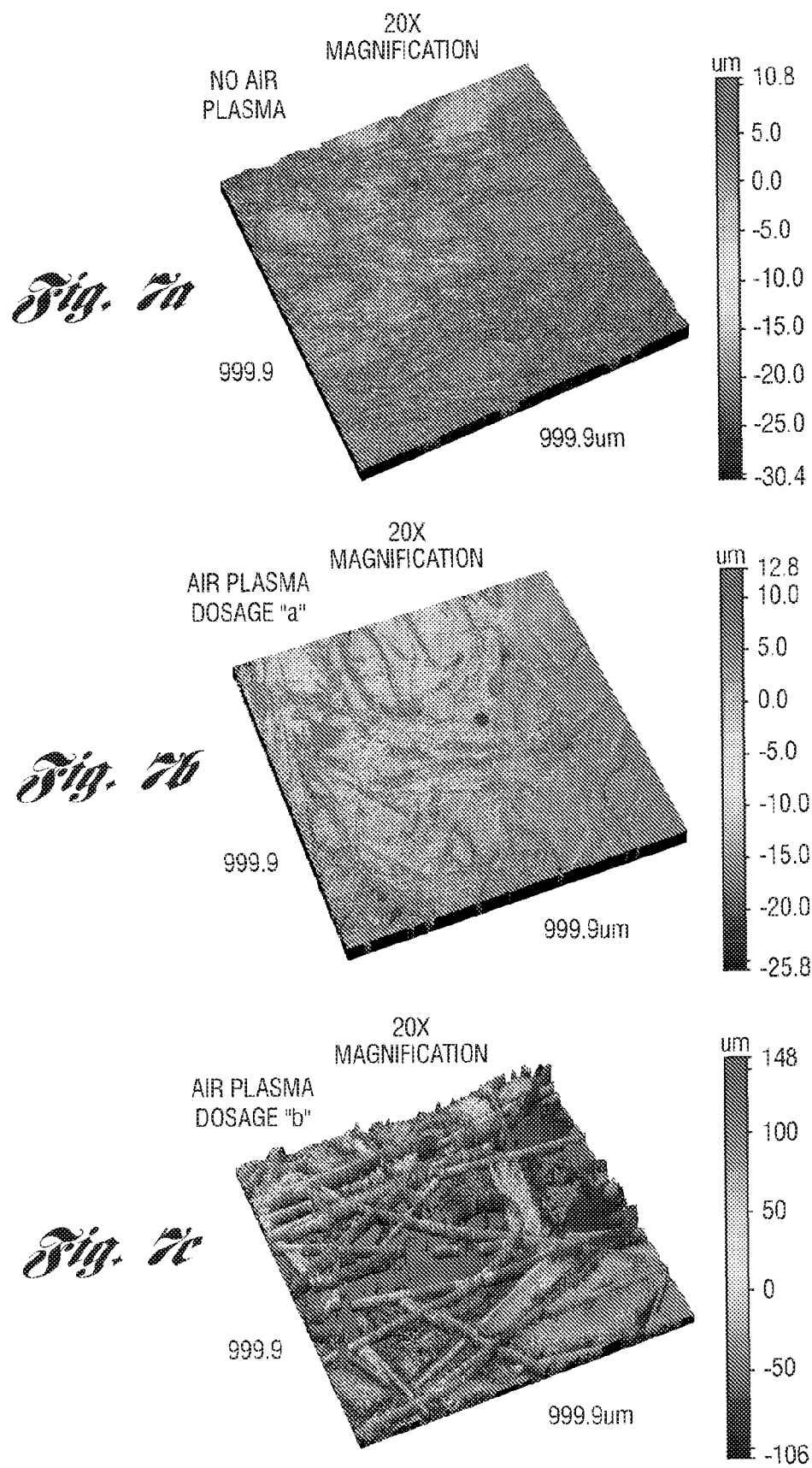

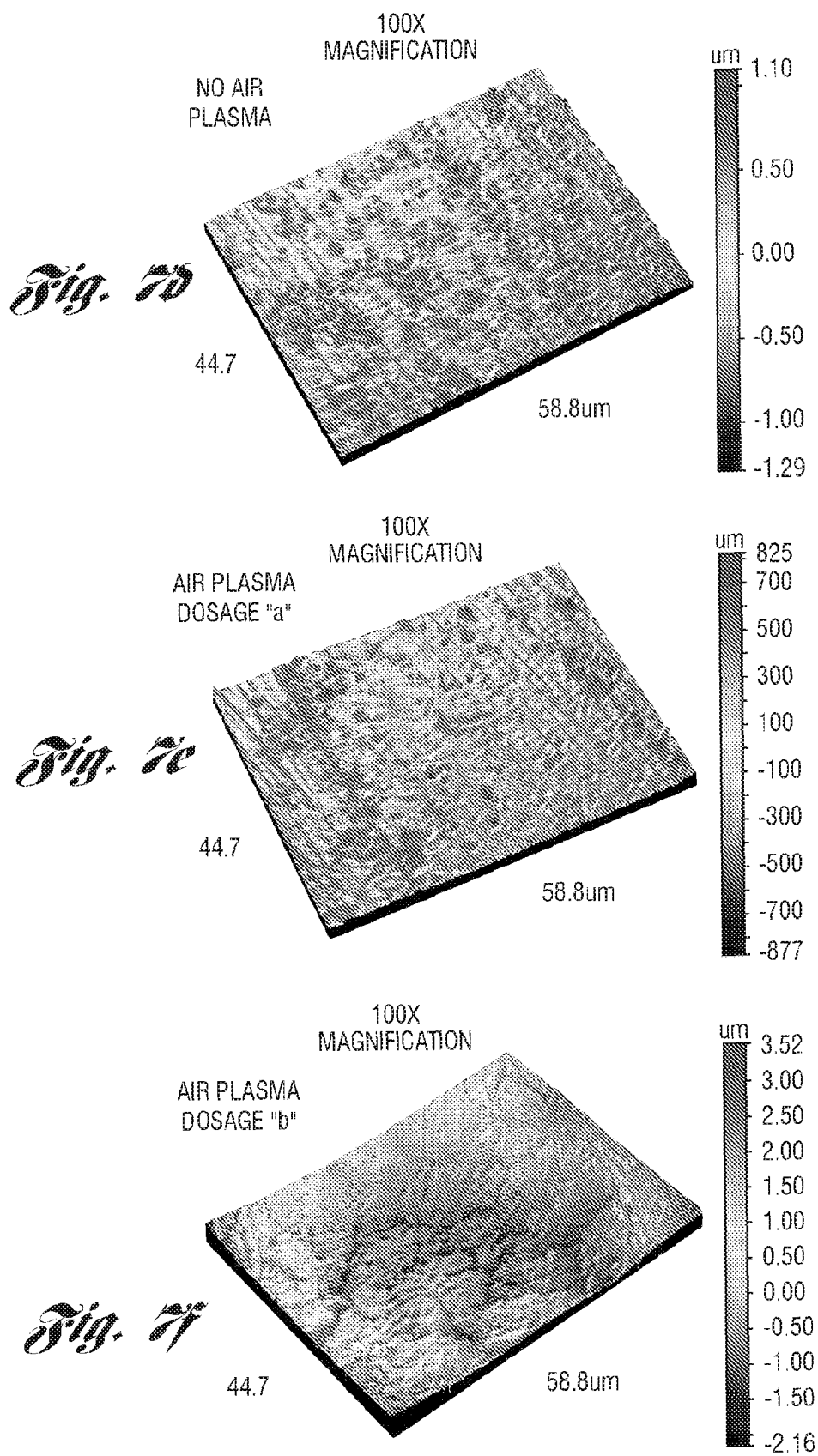

US 9,217,066 B2

STRUCTURAL POLYMER INSERT AND METHOD OF MAKING THE SAME

BACKGROUND

1. Technical Field

At least one aspect of the present invention relates to a structural polymer insert having glass fiber filled polypropylene bonded to an adhesive.

2. Background Art

Metal support structures are often used in the automotive industry to provide strength and energy absorbency into vehicle frames. In situations where certain specifications are mandated by governmental requirements for safety and crash worthiness, glass fiber reinforced polyamide inserts are commonly used in addition to the metal support structures.

However, the glass fiber reinforced polyamide inserts have met with limited use for various reasons, particularly because polyamide often lacks requisite engineering durability. Additionally, polyamide is a relatively expensive material which has discounted substantially the widespread use of the structural polyamide inserts.

SUMMARY OF THE INVENTION

According to at least one aspect of the present invention, a structural polymer insert is provided. In at least one embodiment, the structural polymer insert has a substrate and an adhesive with the substrate being an admixture of a polypropylene component and a glass fiber component. The substrate has a surface and the surface has a plurality of oxygen atoms in an amount of 1 to 60 atomic percent of the total atoms present on the surface. The adhesive is attached to the surface through one or more reactive moieties formed by the oxidative action of the oxygen atoms. In at least one embodiment, the one or more reactive moieties illustratively include hydroxyl, ether, ketone, carboxyl, or any combination thereof.

In at least one embodiment, the substrate surface has a number of nitrogen atoms in an amount of 0.1 to 10 atomic percent of the total atoms present on the surface.

In at least one embodiment, the surface has a number of silicon atoms in an amount of 0 to 5 atomic percent of the total atoms present on the surface.

In at least one embodiment, the substrate surface has an oxygen-to-nitrogen atomic ratio of 5.0 to 12.

In at least one embodiment, the glass fiber component is in the range of 1 to 60 weight percent and in at least one particular embodiment of 30 to 50 weight percent of the total weight of the substrate. In at least another embodiment, the glass fiber component has a mean fiber length no less than 2 millimeters.

In yet at least one embodiment, the adhesive is an expandable foam adhesive and in at least one particular embodiment the foam adhesive is epoxy based.

According to at least one aspect of the present invention, a process is also provided. In at least one embodiment, the process includes providing a substrate having a surface, the substrate being an admixture of a polypropylene component and a glass fiber component; introducing a plurality of oxygen atoms on the surface to form a treated surface; and attaching an adhesive to the surface to produce a bonded article. The process optionally further includes curing the bonded article under heat. In at least one particular embodiment, the introducing is mediated by air plasma treatment.

BRIEF DESCRIPTION OF THE DRAWINGS

FIG. 7 demonstrates a 3-dimensional topography, at 20× or 100×-magnification, of various GFPP specimens, without or with air plasma treatment at dosage "a" and dosage "b", respectively, with FIGS. 7a-7c depicting topographic results at 20× magnification and FIGS. 7d-7f depicting topographic results at 100× magnification;

DETAILED DESCRIPTION OF EMBODIMENTS OF THE PRESENT INVENTION

Figure 1:
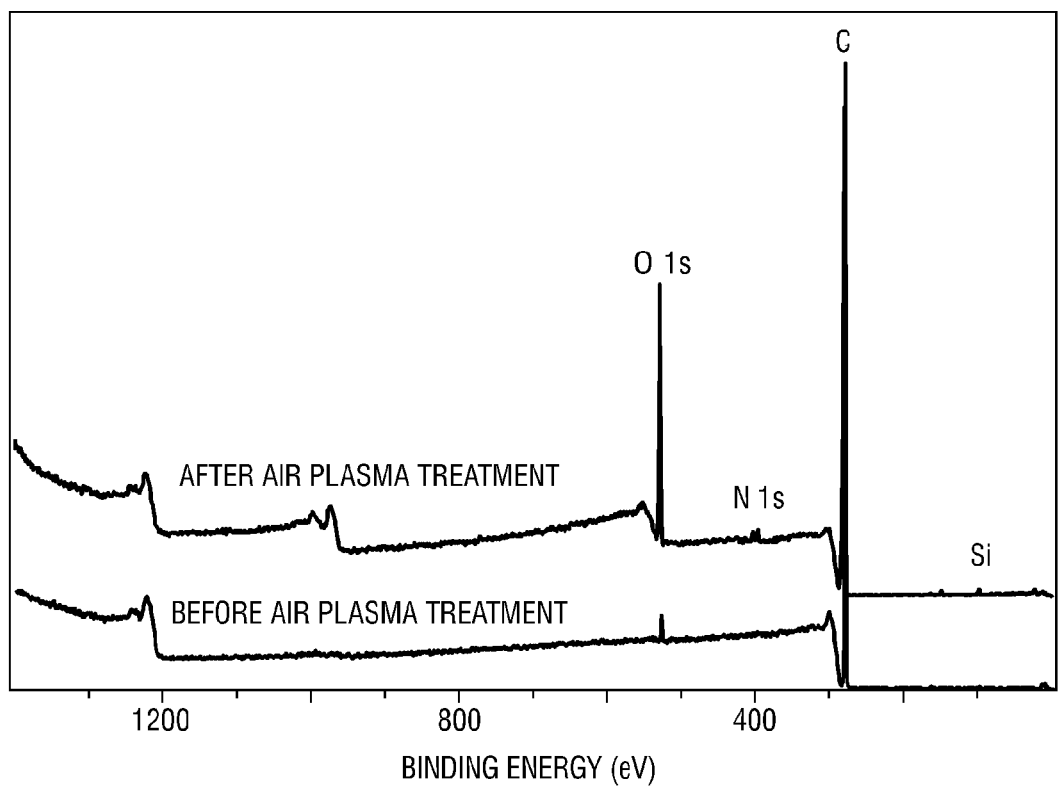
FIG. 1 shows XPS (X-Ray Photoelectron Spectroscopy) survey spectra of GFPP (glass fiber filled polyproylene) specimens having 30 percent by weight of glass fiber component with a mean fiber glass length of 3 millimeters, before and after air plasma treatment.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention. Practice within the numerical limits stated is generally preferred.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

As used herein and unless otherwise indicated, the term "GFPP" is interchangeably used with the term "glass fiber filled polypropylene".

According to at least one embodiment of the present invention, a structural polymer insert with industrially acceptable engineering durability and comparably enhanced economical efficiency is disclosed. In at least one embodiment, the structural polymer insert includes a glass fiber filled polypropylene (GFPP) bonded to a foam adhesive with relatively enhanced lapshear bond strength therebetween.

It has been surprisingly found that a synergistic effect on the bond strength between a glass fiber filled polypropylene substrate and a foam adhesive is realized by an interplay of at least three variables, namely strength and extent of a surface treatment, total weight percentage of the glass fiber component, and length of the glass fibers. In at least one embodiment and as will be described in more detail below, an exemplary air plasma treatment may deliver two separate modes of impact. A first mode is realized when the air plasma is delivered to oxidize the substrate surface carbon moieties to effectuate chemical bond formation between the foam adhesive and the substrate through the oxidized carbon moieties. In at least another particular embodiment, a second mode of impact is delivered when the air plasma further induces surface roughness by etching certain portions of the glass fiber component. These exposed glass fibers may subsequently form mechanical bonds with the foam adhesive so that the bond strength between the foam adhesive and the substrate is further strengthened.

In at least one embodiment, and as will be described in more detail below, inclusion of the glass fiber component functions both to provide structural durability and to maximize the air plasma impact on the bond strength. The inclusion of glass fibers in the polypropylene polymers substantiates the bond strength enhancing effect elicited by the air plasma treatment by at least five (5) folds, as compared to a polypropylene counterpart with zero glass fiber content.

Since the air plasma treatment may be altered in dosage and at certain dosage may etch the substrate up to 80 microns deep from a surface of the substrate, it seems at first glance that the higher the air plasma dosage, the more mechanical bonds, the greater the bond strength. However, a trade-off is found to exist between increases in bond strength verses air plasma intensity. While certain high dosage air plasma creates a rougher surface, yet at the same time, the high dosage air plasma may also induce some over-oxidation of the carbon species on the substrate surface and hence a reduction on the extent of effective surface oxidation.

As will be described in more detail below, surface carbon over-oxidation may reduce, to some extent, the amount of oxidized carbon species on the substrate surface and therefore weakens bond strength intensity. As such, providing a structural polymer insert with relatively enhanced bond strength is at least effectuated by the synergistic interplay of the above-mentioned factors.

Conventional structural inserts are manufactured using polyamide or nylon. Nylon is a thermoplastic silky material made of repeating units linked by peptide bonds or amide bonds. Nylons are condensation copolymers formed by reacting equal parts of a diamine and a dicarboxylic acid, so that peptide bonds form at both ends of each monomer in a process analogous to polypeptide biopolymers. Solid nylon is used for mechanical parts such as gears and other low- to medium-stress components previously cast in metal. Engineering grade nylon is processed by extrusion, casting, and injection molding.

Unlike nylon, polypropylene is a versatile and more cost-effective engineering thermoplastic material. For example, an exemplary going price for glass fiber filled polypropylene is at least forty percent lower than the price for a polyamide counterpart. The cost effectiveness in utilizing the glass fiber filled polypropylene as a component for a structural insert is furthered since the glass fiber filled polypropylene may be manufactured at faster cycle times than the polyamide counterpart. In addition, polypropylene is a thermoplastic polymer having industrially acceptable resistance to fatigue. Polypropylene has a melting point of 160 degrees Celsius. Many plastic items for medical or laboratory use are made from polypropylene because polypropylene can withstand the heat in an autoclave. However, polypropylene suffers from having chemically inert and nonporous surfaces with low surface tensions, as such, raw polypropylene polymers are generally non-receptive to bonding with printing inks, coatings and adhesives. In one or more embodiments, it is an object to increase bonding strength of the polypropylene polymers to foam adhesives so as to provide cost-effective structural plastic inserts with bonding strength suitable for industrial engineering.

In at least one embodiment, a structural polymer insert includes a substrate and an adhesive bonded to the substrate. The substrate is composed of a polypropylene component and a glass fiber component, both components are intermixed with each other. The substrate has a surface which has a plurality of oxygen atoms in an amount of 1 to 60 atomic percent of the total atoms present on the surface. In at least one particular embodiment, the amount of the oxygen atoms is of 10 to 50 atomic percent of the total atoms present on the surface.

In at least one embodiment, the polypropylene component is a number of polypropylene polymer molecules having a weight percentage in the range of 40% to 95% of the total weight of the substrate.

In yet at least one embodiment, the glass fiber component has a weight percentage of 1% to 60%, in at least another embodiment of 10% to 50%, and in at least another particular embodiment of 30% to 50% of the total weight of the substrate.

In yet at least one embodiment, the glass fiber component is a collection of glass fibers having a mean fiber length no less than 2 millimeters. To ensure a certain mean fiber length, the substrate may be molded by combining the polypropylene component and the glass fiber component using low shear screws under conditions that retain the glass fiber length. Conversely, substrates with short glass fibers are molded with high shear screw under conditions enabling the shortening of the glass fibers.

The polypropylene component and the glass fiber component can be combined and admixed using any suitable methods known in the art. One exemplary method is shown in U.S. Pat. No. 3,654,219 to Boyer et al., the content of which is incorporated herein in its entirety by reference. The resulting mixture is optionally subjected to heat curing at a temperature of at least 120 degrees Celsius and preferably at least 135 degrees Celsius. Depending on the particular application involved, the substrate may be molded into various configurations including the configuration where the surface takes the form of a pocket or a cavity.

The adhesive may be expandable or non-expandable depending on the particular application involved. In at least one embodiment, the adhesive is a foam adhesive that is expandable under certain condition which may be externally applied. The condition illustratively includes temperature, pressure, and/or chemistry. By way of example, the foam adhesive may be sensitive to heat and expandable upon the application of a high temperature in the range of 120 to 180 degrees Celsius. The foam adhesive illustratively includes adhesive that is epoxy-based, urethane-based, or silane-based. The epoxy-based foam adhesives are heat expandable and when cured, are more heat- and chemical-resistant than those cured at room temperature. The epoxy-based foam adhesives suitable for forming the structural polymer insert have a typical volume expansion of 150 to 450 percent, in one particular instance of 200 to 400 percent, and in another particular instance of 250 to 350 percent. In at least one embodiment, the GFPP substrate is bonded to the foam adhesive and the resulting bonded article is subject to curing. The curing may be carried out under any suitable condition and in at least one particular embodiment under an externally applied heat upon which the foam adhesive undergoes a heat-assisted volume expansion. In at least one particular embodiment, the bonded article is pre-heated at a temperature from 100 to 200 degrees Fahrenheit. In at least another particular embodiment, the pre-heated bonded article is subject to further heat of a temperature from 200 to 300 degrees Fahrenheit.

In at least one embodiment, the adhesive is attached to the surface of the substrate through at least one connective bond. The connective bond illustratively includes a chemical bond, a mechanical bond, or any combination thereof. The chemical bond may be a hydrogen bond, a van der Waals' bond, an ionic bond, or a covalent bond. By way of example, the covalent bond is formed between one or more reactive moieties present on the surface of the substrate with the reactive moieties illustratively including ether, hydroxyl, ketone, and carboxyl. These reactive moieties are various chemical states of carbon atoms that are oxidized by oxygen atoms.

In at least one embodiment, the oxygen atoms are delivered onto the surface through application of a surface treatment. Surface treatment improves bonding characteristics between the substrate and the foam adhesive, e.g., by increasing the substrate's inherent surface energy. The surface treatment is applied to the substrate surface to modify surface roughness and/or to facilitate the conversion of surface atoms such as carbon atoms to carbon species having reactive moieties. Suitable surface treatment illustratively includes air plasma, Corona, UV/ozone flame plasma, chemical plasma, or other atmospheric plasma using nitrogen or helium as carrier gas.

Corona plasma generally uses a high-frequency power generator, a high-voltage transformer, a stationary electrode, and a treater ground roll. Standard utility electrical power is converted into higher frequency power which is then supplied to a treater station. The treater station applies this power through ceramic or metal electrodes over an air gap onto a surface to be treated.

Flame plasma treaters generate typically more heat than other treating processes, but materials treated through this method tend to have a longer shelf-life. These plasma systems are different than air plasma systems because flame plasma occurs when flammable gas and surrounding air are combusted together into an intense blue flame. Surfaces are polarized from the flame plasma affecting the distribution of the surfaces' electrons in an oxidation form. Due to the high temperature flammable gas that impinges on the surfaces, suitable methods should be implemented to prevent heat damages to the surfaces.

As known in the art, chemical plasma is often categorized as a combination of air plasma and flame plasma. Somewhat like air plasma, chemical plasma is delivered by an electrically charged air. Yet, chemical plasma also relies on a mixture of other gases depositing various chemical groups onto a to-be-treated surface. When a chemical plasma is generated under vacuum, surface treatment may be effectuated in a batch process (such as when an article is singly located within a vacuumed chamber for treatment) rather than an in-line process (such as when a plurality of articles are sequentially lined-up for treatment).

Air plasma is similar to Corona plasma yet with differences. Both air plasma and Corona plasma use one or more high voltage electrodes which positively charge surrounding air ion particles. However in air plasma systems, the rate oxygen deposition onto a surface is substantially higher. From this increase of oxygen, a higher ion bombardment occurs. By way of example, an exemplary air plasma treatment method is illustratively detailed in the U.S. Patent Publication titled "method of treating substrates for bonding" (publication number US 2008-0003436), now U.S. Pat. No. 7,744,984, the content of which is incorporated herein in its entirety by reference.

In at least one embodiment, various atoms are being deposited onto or become exposed upon the substrate surface through the air plasma equipment. Atoms being elicited on the substrate surface illustratively include oxygen atoms, nitrogen atoms, and silicon atoms. The oxygen atoms, in particular, consequently induce the oxidation of carbon atoms on the substrate surface and the transformation thereof to reactive moieties in the form of ether or hydroxyl, carbonyl, and carboxyl, with the hydroxyl moiety being the most reactive in causing covalent bond formation between the substrate and the foam adhesive.

In at least one embodiment, topography is used to measure surface roughness of the PP (pure polypropylene with zero glass fiber content) and the GFPP specimens upon an air plasma treatment. Topography measurements are usually made using optical profilometry with a Wyko NT-3300 system. Surface characterization of a surface may be performed by using X-ray photoelectron spectroscopy (XPS). X-ray photoelectron spectroscopy surface characterization measurements relate increased bond strength to the presence of surface hydroxyl functionality that enables the formation of covalent bond linkage to a foam adhesive. The instrument illustratively used may be Kratos AXIS 165 Electron Spectrometer manufactured by Kratos Analytical, Manchester, England. Photoelectrons are generated using a monochromatic Al K-alpha (1486.6 eV) x-ray excitation source operated at 15 kV, 20 mA (300 W) and collected using hybrid mode magnification with the analyzer at a 20 eV pass energy for high resolution spectra, and a 80 eV pass energy for elemental surveys. High-resolution C is core level spectra is acquired for specification of carbon oxidation chemistry. The C is core level refers to electrons that reside in the carbon is orbital atomic core level. The XPS C is core level spectrum is the spectrum of photo-electron emission that occurs from the C (carbon) is core level as a consequence of sample irradiation by Al K-alpha X-rays. Quantification of survey data is accomplished by procedures based on Scofield photoionization cross-section values. A least-squares based fitting routine is used to peak fit the high-resolution core level spectra. The least-squares based fitting routine is used whereby peaks are added manually based on best judgment and the routine is allowed to iterate freely on peak height, peak width, and binding energy position to synthesize a C (carbon) is envelope that most closely matches the acquired envelope. Binding energies are referenced to the aliphatic C is line at 284.6 eV.

In at least one embodiment, the air plasma treatment, at a certain dosage and in concert with the glass fiber component included in the substrate, also effectuates the generation of a mechanical bond between the foam adhesive and the substrate surface. In at least one embodiment, the mechanical bond is illustratively formed through a portion of glass fibers otherwise localized up to 80 microns deep from the surface and become exposed by the application of the surface treatment. Assuming a stoichiometric mixture is provided, a GFPP having 50 weight percent of glass fiber component may be oxidized to yield a surface of about 45.3 atomic percent of oxygen atoms. When the surface is completely, at least theoretically, depleted of carbon atoms by etching, an oxygen content on the surface in an amount of 66.7 atomic percent may result. The 66.7 atomic percent of oxygen atoms on the surface illustratively represents a situation where the silicon atoms are substantially oxidized by the etching process.

Depending on the glass fiber content and mean fiber length of a particular substrate, an air plasma treatment at certain dosage facilitates the beneficial formation of both the chemical bonds and the mechanical bonds between the substrate and the foam adhesive. Care should be taken, however, to ensure a proper range of air plasma intensity with which the substrate surface is treated. It is discovered that the effect of the air plasma treatment applicable to the glass fiber filled polypropylene substrate may be binary in that air plasma treatment at a certain dosage may actually discount the beneficial enhancement of the bond strength. While not intended to be limited by any particular theory, one possible mechanism may be proposed as to why a reduced amount of oxidized species is identified with certain extended air plasma treatment. It is known (Walzak M J et al., Journal of Adhesion Science and Technology, 9(9), 1229-1248, 1995) that extended surface oxidation results in chain scission reactions and the formation of low-molecular-weight oxidized materials (LMWOM). The LMWOM further oxidizes to form carbon dioxide gas. Thus, while an air plasma treatment at certain dosage induces the formation of oxidized moieties that remain cross-linked on the substrate surface, yet additional dosages may over-oxidize the substrate surface and causes the formation of LMWOM and/or carbon dioxide. The LMWOM and the carbon dioxide are comparably less cross-linkable to the substrate surface and are subsequently blown away and expelled from the surface with high-velocity airflow and direct surface impingement inherent with the air plasma treatment.

The effectiveness of the air plasma treatment on enhancing the bond strength of the GFPP substrate to a foam adhesive varies as to the mode of operation. Variable aspects of the air plasma operation mainly include the distance between the plasma beam nozzle and the substrate surface, the moving rate of the plasma beam nozzle, and whether the plasma beam rotates or is rather static. These parameters are chosen in a coherent fashion so as to bring out the most effective bonding enhancement particular to the glass fiber filled polypropylene substrate and the foam adhesive.

As revealed by the surface topography measurements, air plasma treatment at a certain low dosage increases surface roughness of GFPP by a factor of several times; while an increase in surface roughness by a factor of up to forty (40) times may be realized when the air plasma treatment is operated at a certain high dosage. It is generally accepted that the slower the beam nozzle moves and/or closer the beam nozzle is to a surface, more intensified the air plasma treatment becomes. For a static non-rotating plasma beam, one exemplary low dosage air plasma may be generated when a distance between the beam nozzle and the substrate surface is kept at a value between 10 to 20 millimeters and/or the beam nozzle moving speed relative to the surface is between 300 to 800 millimeters per second. One exemplary high dosage air plasma may be generated when a distance between the beam nozzle and the substrate surface is below 5 millimeters and/or the beam nozzle moving speed relative to the surface is at or below 150 millimeters per second. At a given glass fiber content and subject to certain limitations as will be elucidated in detail below, the higher the air plasma dosage, the rougher the substrate surface. The increase in surface roughness is mainly due to the fact that more portions of the glass fiber component of the substrate, otherwise localized up to 80 microns deep from the surface, are being exposed to the surface by air plasma etching. When presented with an increase amount of glass fibers being exposed, the substrate surface is better situated to form mechanical bonds with a foam adhesive through the exposed glass fiber.

In at least one embodiment, a rotational non-static beam, such as a table-top unit, may be used for delivering certain dosages of air plasma treatment. The unit having a RD-1004 head with a 2000 rpm rotating 1-inch diameter nozzle is operated at 9.5 amps of current. To effectuate an exemplary low air plasma dosage, the beam nozzle of the unit may be positioned at a distance of 8 millimeters from the surface at a speed of 83.3 millimeters per second. To effectuate an exemplary high air plasma dosage, the beam nozzle of the unit may be positioned at a distance at or below 5 millimeters with a delivery speed at or below 33 millimeter per second.

Conventional sanding which, while increasing roughness of a surface, causes accumulation of unwanted waste from both the surface material and the sanding tool. As such, the sanding often results in a layer of physical waste debris that impedes subsequent bonding. Unlike conventional sanding, the surface treatment such as the air plasma treatment increases surface roughness by exposing glass fibers for forming mechanical bonds thereof to the foam adhesive. As such, the air plasma treatment effectively enhances surface roughness without having to cause unnecessary physical waste debris.

In at least one embodiment, the polymer insert further includes an outer layer attached to the substrate and in another embodiment positioned away from the foam adhesive. The outer layer provides additional structural support. The substrate may be molded directly onto the outerlayer during construction. An exemplary outer layer is made of metals illustratively including aluminum, cast iron, steel, fabrics, wood, bamboo, other thermoplastic or thermosetting polymers, or any combination thereof.

Having generally described this invention, a further understanding can be obtained by reference to certain specific examples which are provided herein for purposes of illustration only and are not intended to be limiting unless otherwise specified.

Example 1

X-Ray Photoelectron Spectroscopy Surface Analysis-Part I

The glass fiber filled polypropylene specimens (GFPP specimen) having variable glass fiber content of 10 to 50 weight percent and with a mean glass fiber length of 3 millimeters are manufactured to have dimensions of 25 millimeters in width, 3.0 millimeters in thickness, and 100 millimeters in length. The GFPP specimens are characterized by X-ray photoelectron spectroscopy before and after an air plasma treatment. Low dosage rotational air plasma is carried out at a speed of 50 millimeters per second and a nozzle distance of 6 millimeters. The results are included in Table 1. The base polypropylene polymer specimens with zero percent of glass fiber content exhibit a surface composition of 99% or greater in carbon atoms. The air plasma treatment creates a substantial amount of oxygen, with a concomitant amount of nitrogen generated possibly from the air plasma source. In addition, silicon is also observed. Interestingly, the silicon content does not seem to be in direct proportion, as seen in this example, with respect to weight percentages of the glass fiber component. It is possible that the air plasma with the dosage used in this example exposes sub-surface silicon nano-particles, without yet etching the surface sufficiently to expose the glass fibers.

TABLE 1

Surface atomic composition of GFPP specimens upon air plasma treatment - part I

| Treatment | % Glass Fiber | Composition - Atomic Percent base on All the Surface Atoms Detected | | | | |
|---|---|---|---|---|---|---|
| | | Carbon | Oxygen | Nitrogen | Silicon | Others |
| None | 10 | 99.0 | 1.0 | | | |
| | 20 | 99.0 | 1.0 | | | |
| | 30 | 99.7 | 0.3 | | | |
| | 40 | 99.6 | 0.4 | | | |
| | 50 | 99.6 | 0.4 | | | |

TABLE 1-continued

Surface atomic composition of GFPP specimens upon air plasma treatment - part I

| Treatment | % Glass Fiber | Composition - Atomic Percent base on All the Surface Atoms Detected | | | | |
|---|---|---|---|---|---|---|
| | | Carbon | Oxygen | Nitrogen | Silicon | Others |
| Air Plasma | 10 | 68.1 | 26.6 | 1.8 | 3.3 | 0.4 |
| | 20 | 65.1 | 28.0 | 1.4 | 5.0 | 0.9 |
| | 30 | 77.6 | 19.8 | 1.8 | 0.4 | 0.6 |
| | 40 | 74.1 | 23.3 | 2.7 | | |
| | 50 | 83.5 | 14.8 | 1.7 | | |

Blanks in Table 1 indicate that relevant test parameters are below detectable range.

It should be noted, from the Table 1 shown above, that a reduction in surface carbon content and an concurrent increase in surface oxygen content is consistently observed amongst the various GFPP specimens tested. As such it can be reasonably concluded that the GFPP specimens respond fairly similarly to a given air plasma treatment within a relatively broad glass fiber loading range, for example, from 10 to 50 weight percent.

Figure 2A:
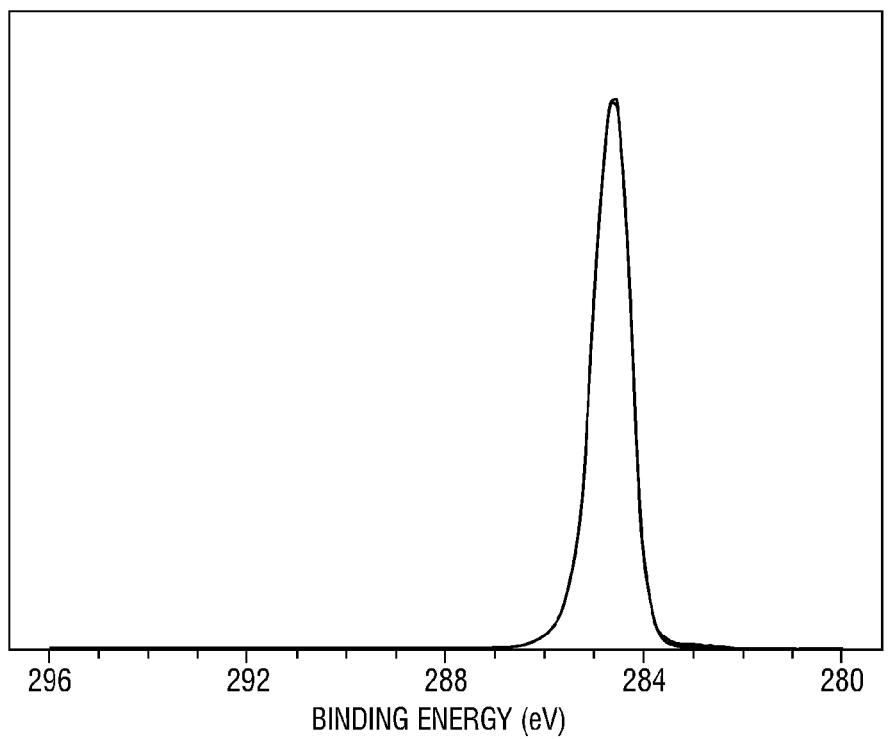
FIGS. 2A and 2B depict XPS C (Carbon)1s core level spectrum of the GFPP specimens in FIG. 1, before (2A) and after (2B) of the air plasma treatment.
Figure 2B:
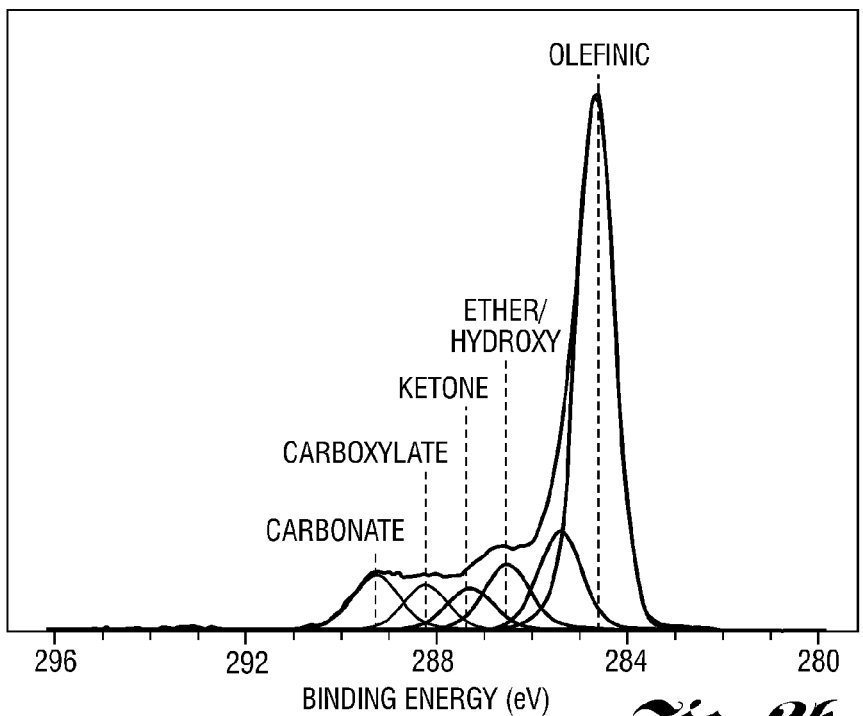

FIG. 1A shows XPS survey spectra acquired from the GFPP specimens reported in Table 1 above. The spectra reveal the evolution of oxygen and nitrogen on the surface as a result of the air plasma treatment. The details of oxygen incorporation are shown in the XPS C is core level spectra of FIG. 2A. The initial spectrum contains a single peak at 284.6 eV, attributed to the olefinic carbon. After the air plasma treatment, additional peaks appear as the oxidized carbon species such as ether, hydroxyl, ketone, and carboxyl (FIG. 2B).

Example 2

X-Ray Photoelectron Spectroscopy Surface Analysis-Part II

Surface composition investigation is further carried out with respect to those GFPP specimens having a narrower range of glass fiber content and under additional experimental variations. The GFPP specimens are prepared by the same method set forth in the Example 1 above. In addition, the GFPP specimens are categorized with respect to glass fiber content (0, 20, or 30 weight percent), mean fiber glass length (1 millimeter verses 3 millimeters), and air plasma dosage (dosage "a" verses "b"). Surface atomic compositions, reported as atomic percent of all the atoms detected on a GFPP specimen surface, are reported in Table 2. Again, it is observed that all specimens without air plasma treatment have a surface composition essentially of carbon atoms.

TABLE 2

Surface atomic composition of GFPP test specimens upon air plasma treatment - part II

| Specimen | Air Plasma Treatment | Mean Fiber Length (millimeter) | Glass Fiber Content (wt %) | Elemental Composition - Atomic Percent | | | | | O/N Ratio |
|---|---|---|---|---|---|---|---|---|---|
| | | | | C | O | N | Si | Other | |
| "000PP-0" | None | n/a | 0 | 99.1 | 0.9 | | | | |
| "S20GFPP-0" | | 1 | 20 | 99.3 | 0.7 | | | | |
| "S30GFPP-0" | | | 30 | 99.3 | 0.8 | | | | |
| "L20GFPP-0" | | 3 | 20 | 99.5 | 0.5 | | | | |

TABLE 2-continued

Surface atomic composition of GFPP test specimens upon air plasma treatment - part II

| Specimen | Air Plasma Treatment | Mean Fiber Length (millimeter) | Glass Fiber Content (wt %) | Elemental Composition - Atomic Percent | | | | | O/N Ratio |
|---|---|---|---|---|---|---|---|---|---|
| | | | | C | O | N | Si | Other | |
| "L30GFPP-0" | | | 30 | 99.8 | 0.2 | | | | |
| "000PP-a" | Air Plasma | n/a | 0 | 62.8 | 32.8 | 4.4 | | 0.2 | 7.5 |
| "S20GFPP-a" | Dosage "a" | 1 | 20 | 70.4 | 26.7 | 3.3 | | 0.1 | 8.2 |
| "S30GFPP-a" | | | 30 | 65.9 | 30.4 | 3.5 | | | 8.6 |
| "L20GFPP-a" | | 3 | 20 | 75.3 | 21.3 | 2.4 | 0.8 | | 8.9 |
| "L30GFPP-a" | | | 30 | 67.4 | 27.2 | 2.0 | 2.5 | 1.0 | 13.7 |
| "000PP-b" | Air Plasma | n/a | 0 | 72.0 | 25.0 | 3.1 | | | 8.1 |
| "S20GFPP-b" | Dosage "b" | 1 | 20 | 73.6 | 23.8 | 2.3 | 0.3 | | 10.2 |
| "S30GFPP-b" | | | 30 | 73.3 | 23.7 | 1.7 | 0.9 | | 14.2 |
| "L20GFPP-b" | | 3 | 20 | 75.3 | 21.3 | 2.4 | 0.8 | | 8.9 |
| "L30GFPP-b" | | | 30 | 67.4 | 27.2 | 2.0 | 2.5 | 1.0 | 13.7 |

Blanks in Table 2 indicate that relevant test parameters are below detectable range.

The rotational treatment for air plasma dosage "a" is moved at a speed of about 83 millimeters per second while a static non-rotating plasma beam moving at 150 millimeters per second is used for dosage "b". As defined previously, a rotational plasma beam, in general, delivers a much lower plasma intensity when compared to a static non-rotating plasma beam. As designed herein, the dosage "a" is characterized as a lower dosage in air plasma intensity when compared to the dosage "b". Both the "a" and the "b" dosages of the air plasma treatments create a substantial amount of oxygen, with a concomitant amount of nitrogen generated from the air plasma source. With the dosage "a" treatment, oxygen uptake is 26.7 to 32.8%, with 3.3 to 4.4% of nitrogen. The oxygen/nitrogen ratio measured on the surface is around 8 or 9, just over double the composition ratio of the air source used to generate the plasma, which is 3.7 (78.1/20.9). Interestingly, the amount oxygen and nitrogen incorporated at the dosage "b" is actually about 20% less than that observed at the lower dosage. As such, it is observed that certain air plasma dosages, such as the dosage "b" here, may retard the extent of oxidative state of the specimen surfaces.

Figure 3:
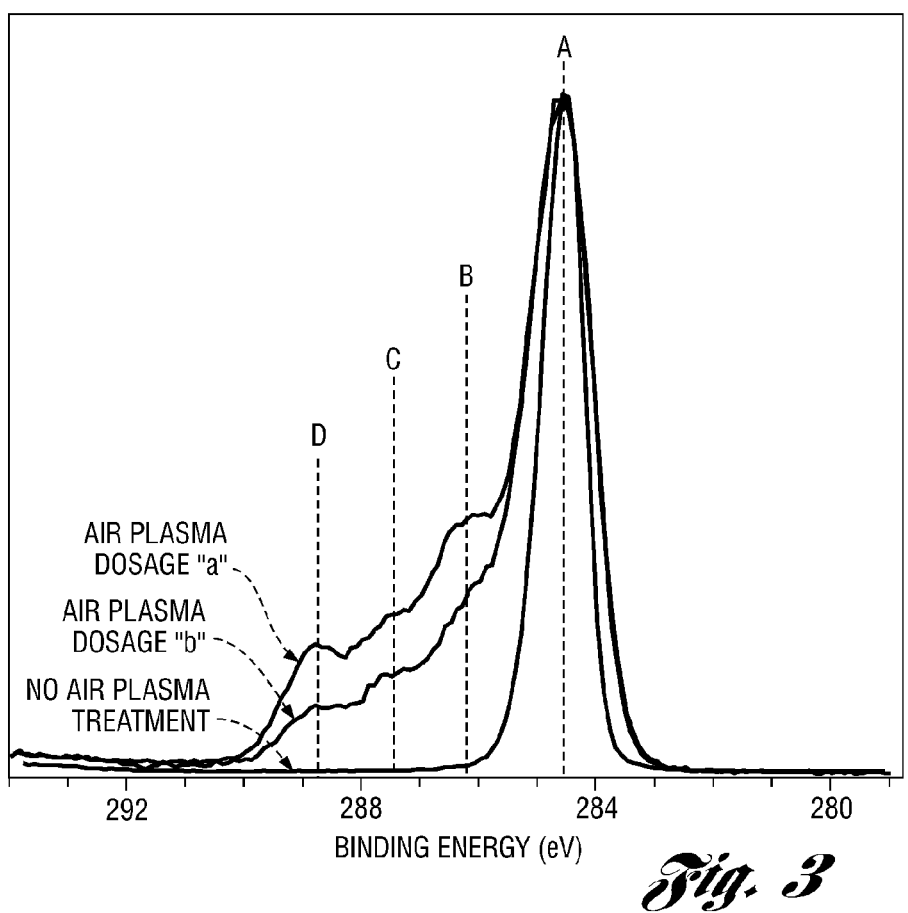
FIG. 3 shows XPS C is core level spectra of GFPP specimens having 30 percent by weight of glass fiber component with a mean glass fiber length of 3 millimeters, without and with air plasma treatment at dosage "a" and dosage "b"

XPS high resolution C is core level spectra is again employed to determine the chemical state of carbon after each treatment. FIG. 3 shows overlaid C is core level spectra of the 30% GFPP specimens with mean fiber length of 3 millimeters reported in Table 2 above. The spectrum acquired from the L30GFPP specimens shows a single peak at 284.6 eV identified as aliphatic carbon (A). After the low dosage air plasma treatment, additional peaks are observed with the L30GFPP-a specimens at binding energies of 286.2 eV, 287.4 eV, and 288.7 eV, identified as ether/hydroxyl (B), ketone (C), and carboxylate (D) chemical states, respectively. While still being significantly greater than those observed without the L30GFPP-0 specimens that are without any air plasma treatment, the amount of oxidized carbon species detected from the L30GFPP-b specimens are relatively lower than those with the L30GFPP-a specimens.

Example 3

Surface Topography Analysis

Optical profilometry is performed on various GFPP specimens to determine to what extent surfaces of the GFPP specimens are physically affected by an air plasma treatment. The topography is measured at 20× and 100× magnification to examine the roughness at different length scale. The 20× magnification measurements reveal structures between base polypropylene polymer and the glass fibers, whereas the 100× magnification measures more detailed structures among the glass fibers of the specimens.

Roughness measurements are presented in terms of Rq, root-mean square deviation from center where, $$Rq = \sqrt{\frac{1}{n}\sum_{i=1}^{n}(Z_i - \bar{z})^2} \quad (1)$$

n is the number of data points; z is the deviation from the center of the surface plane, $\bar{z}$. For 100× magnification, n=353,280 (736×480) and the point resolution is 79.9 nm. For 20× magnification, n=1,300,993 (1232×1056) and the point resolution is 811 nm. The effect sample tilt is removed from all presented data and calculations.

Figure 4:
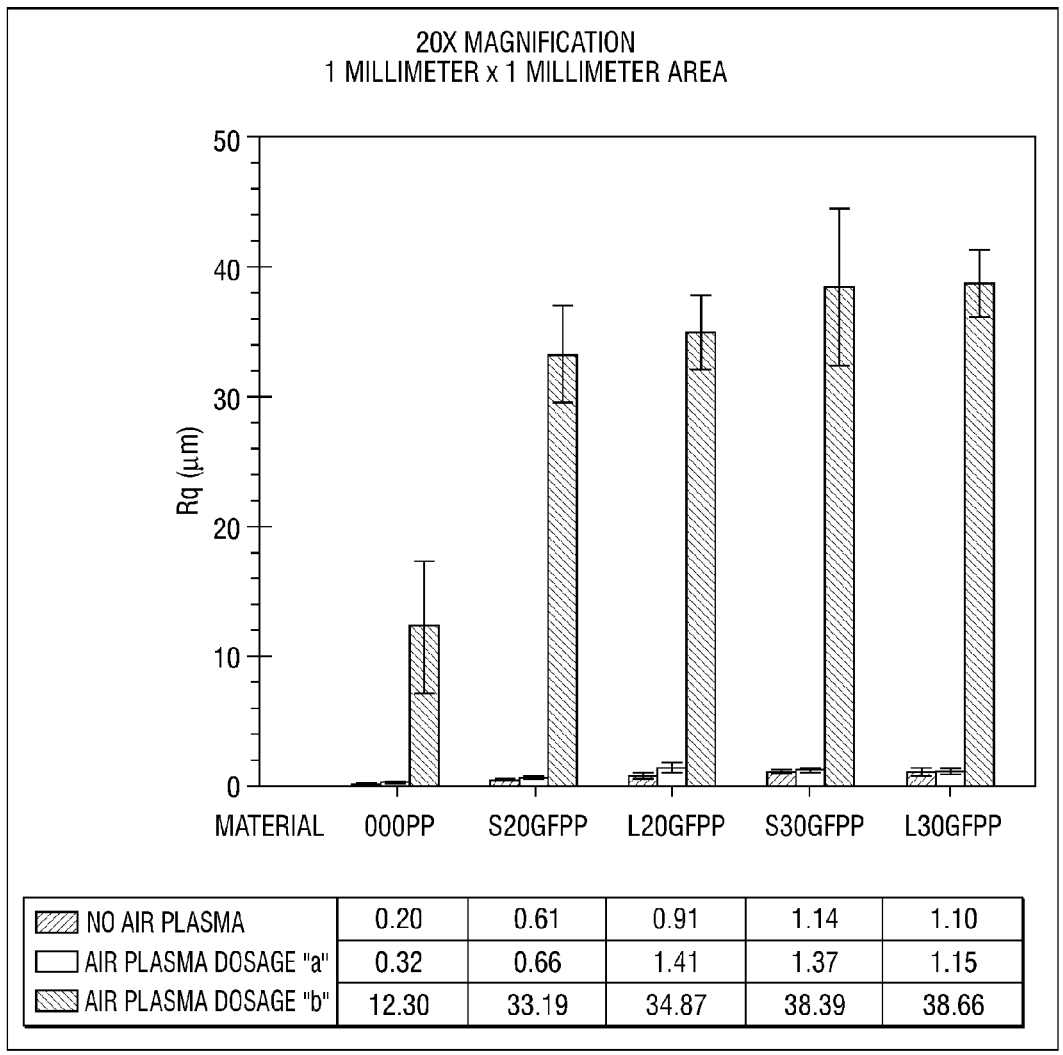
FIG. 4 illustrates 20×-magnification surface roughness using topography measurements.

The 20× magnification topography measurements within 1 mm$^2$ (square millimeter) area of the specimens reported in Example 2 above is presented in FIG. 4. Measurements at the 20× magnification include the topography introduced by the imbedded glass fibers. Each Rq value in the unit of micrometer (μm) is reported in average of three measurements with error bars representing one standard deviation. Within the specimens tested, there is no statistically significant differences in Rq between the untreated specimens and the specimens exposed to the dosage "a" air plasma treatment, with values of Rq all under 2 μm. However, there is an observable trend of average roughness increasing with fiber length (1 to 3 millimeters) and also with glass fiber content (20 to 30%). In contrast, surface roughness of the GFPP specimens increases dramatically, for example, by more than 30 times, after the dosage "b" air plasma treatment. Also, there is an observable trend of average roughness increasing with fiber length (1 to 3 millimeters) and also with glass fiber content (20 to 30%).

Figure 5:
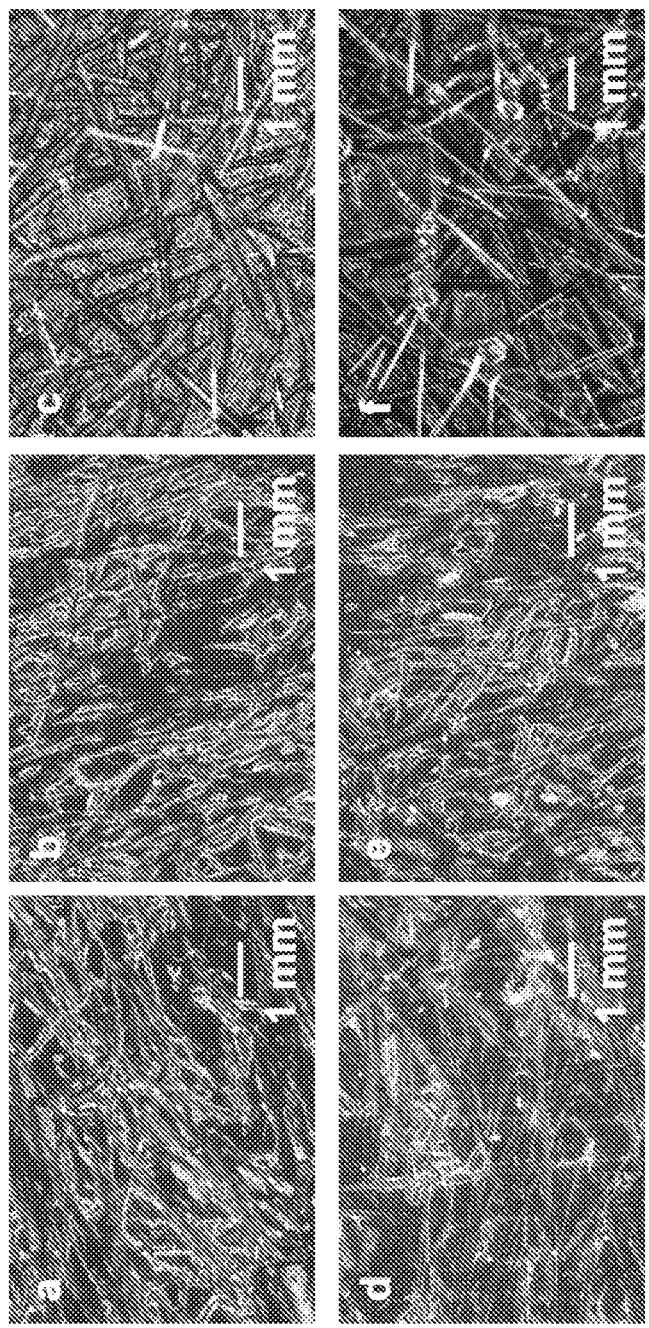
FIG. 5 illustrates optical stereomicrographic surface images of various GFPP specimens, without and with air plasma treatment at dosage "a" and dosage "b", respectively.

The change in surface reflectivity of the specimens reported in Table 2 above is represented in the optical micrographs as shown in FIG. 5. FIGS. 5a-5c depict the optical micrographs relevant to the S30GFPP-0 specimens, the S30GFPP-a specimens, and the S30GFPP-b specimens, respectively. FIGS. 5d-5f depict the optical micrographs relevant to the L30GFPP-0 specimens, the L30GFPP-a specimens, and the L30GFPP-b specimens, respectively.

Figure 6:
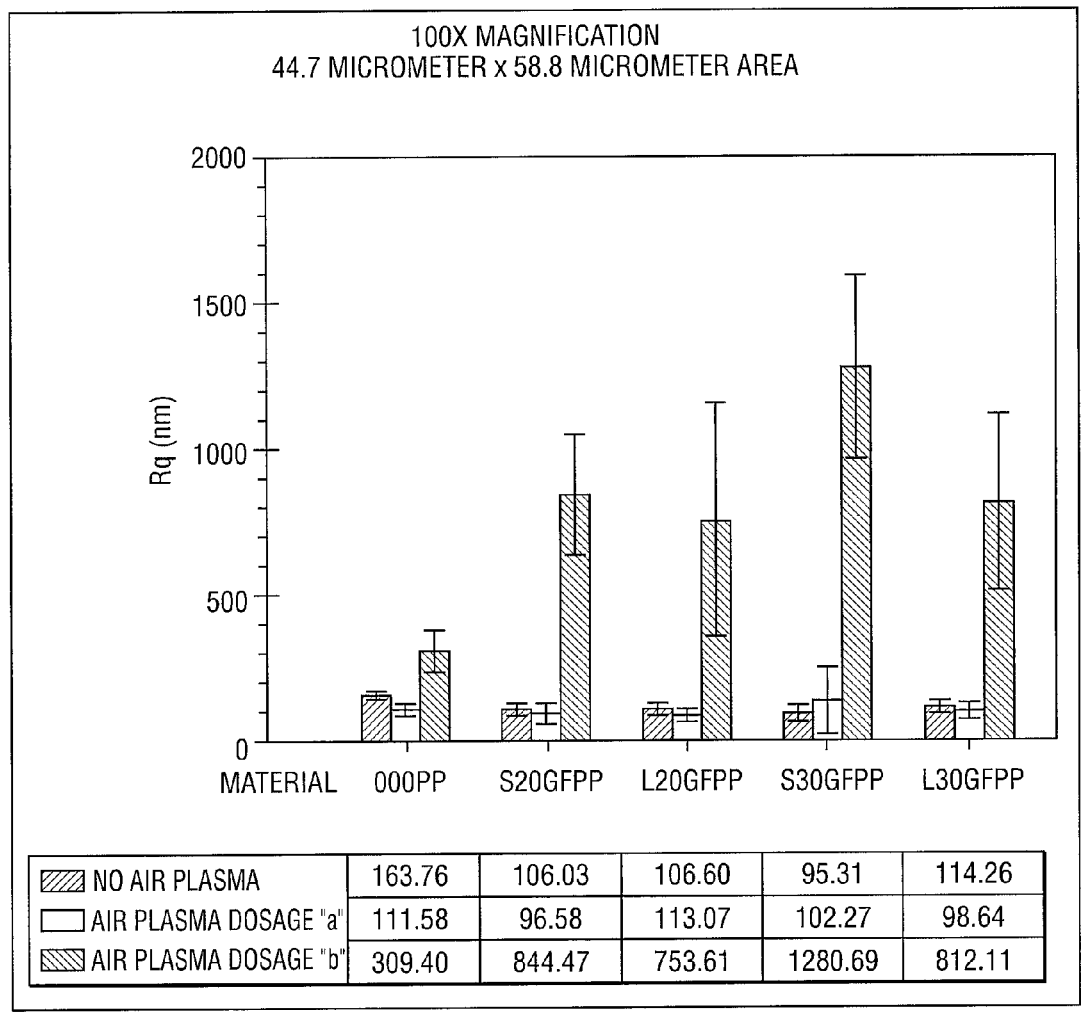
FIG. 6 shows topography measurements presenting 100×-magnification surface roughness of the GFPP specimens, without or with air plasma treatment at dosage "a" and dosage "b", respectively.

The 100× magnification topography measurements within a smaller area of 44.7 µm (micrometers)×58.8 µm (micrometers) of the specimens reported in Example 2 above is presented in FIG. 6. The longer wavelength waviness previously observed with the larger area (1 mm×1 mm) is effectively filtered out at the 100× magnification. Each Rq value in the unit of nanometer (nm) is reported in average of 10 measurements with error bars representing one standard deviation. The data reported with the 100× magnification shows a trend of changes that is very similar to the date reported with the 20× magnification shown in FIG. 4. However, Rq values measurable with the 100× magnification are considerably lower than those measurable with the 20× magnification as shown in FIG. 4, partly because the smaller area of 44.7 µm×58.8 µm measured under the 100× magnification substantially excludes the inclusion of glass fibers and represents rather the waviness of the polypropylene resin itself.

Impact of the air plasma treatment towards surface roughness of the L30GFPP specimens reported in Table 2 above is further represented by 3-dimensional plots shown in FIG. 7, in 20× or 100× magnification. The 3-D profiles of both the untreated and low-dose treated samples confirm that there is little difference in the surface appearance at either magnification. At the 20× magnifications, it is observed that the dosage "b" air plasma treatment has induced the exposure of glass fibers of the specimens. The profile of the specimens after the dosage "b" air plasma treatment, as shown in the 100× magnification image, also shows a change in appearance. The surface may have melted and reformed due to high temperatures encountered during the dosage "b" air plasma treatment.

Example 4

Adhesion Testing

The bond strength is recorded in the unit convention of psi and measured by a lapshear test. The lap shear determines the shear strength of adhesion between the substrate and the foam adhesive. The GFPP test specimens are placed in the grips of a testing machine and pulled at a rate about 5 millimeters per minute until failure occurs.

Exposure of glass fibers presents mechanical bonds for a foam adhesive to bond to; yet certain high air plasma dosage, as reported in Example 3 above, may reduce the amount of the oxidized carbon species. As such, an experiment is designed to elucidate how an overall adhesion characteristic of the GFPP specimens may be affected by factors of plasma dosage, glass fiber content, and glass fiber length.

Figure 8:
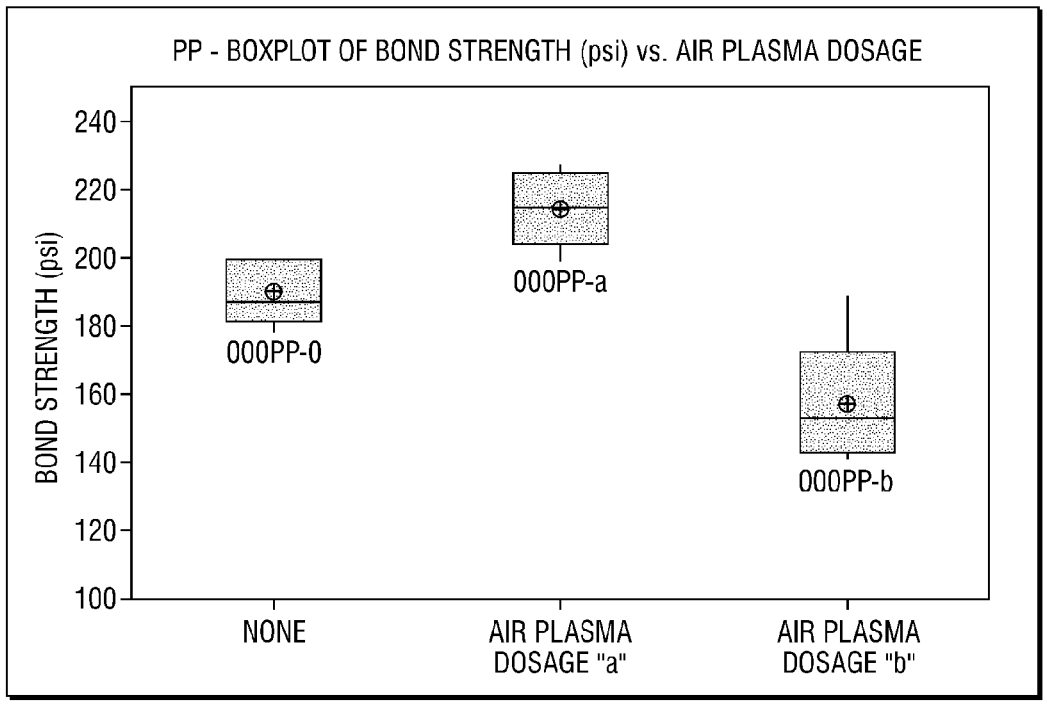
FIG. 8 depicts boxplots showing the mean and distribution of lapshear bond strength measurements (five replicates per group) of pure polypropylene specimens, without or with air plasma treatment at dosage "a" and dosage "b", respectively.
Figure 9:
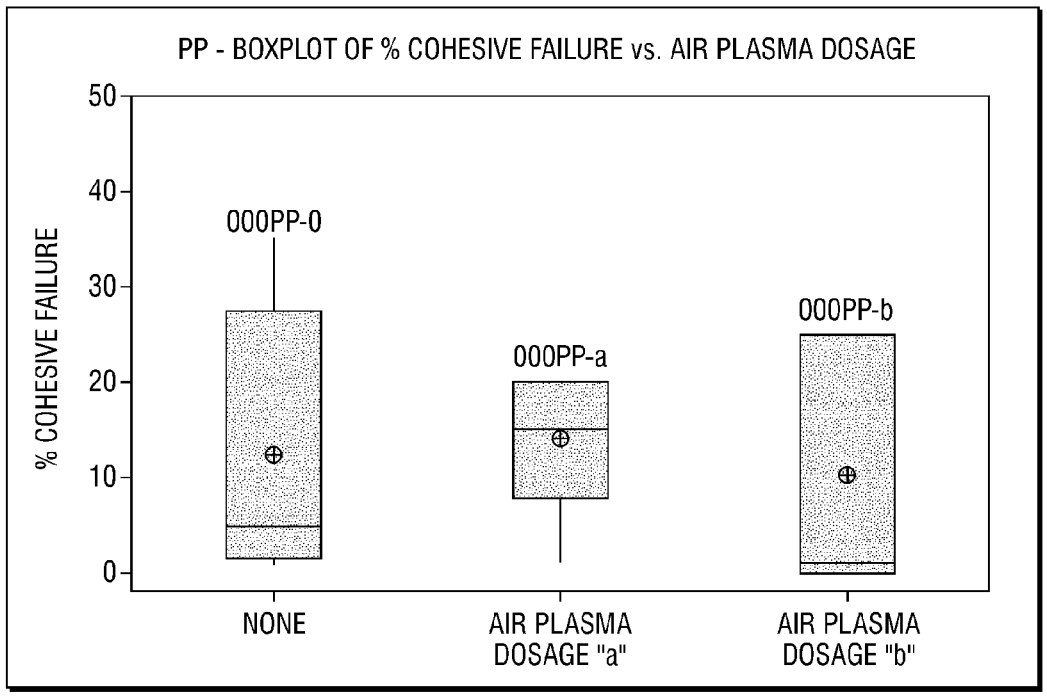
FIG. 9 depicts boxplots showing the mean and distribution of bond failure mode (five replicates per group) of pure polypropylene specimens, without or with air plasma treatment at dosage "a" and dosage "b", respectively.

FIG. 8 shows the distribution of adhesive bond strengths measured from the 000PP-0 specimens, the 000PP-a specimens, and the 000PP-b specimens reported in Table 2 above. Bond strength is measure through lapshear test and five lapshear measurements are made for each test condition. The mean bond strength (215 psi) of the 000PP-a specimens increases slightly from 190 psi for the 000PP-0 specimens. With a higher dosage treatment of the dosage "b", the mean bond strength of the 000PP-b specimens is observed to have decreased from 190 to 157 psi, or 21.0%. The mode of adhesion failure for the same set of specimens is reported in FIG. 9. As shown in FIG. 9, only 10 to 14% cohesive failure is similarly observed across the specimens.

Similar lapshear testings are also conducted on the L30GFPP-0 specimens, the L30GFPP-a specimens, and the L30GFPP-b specimens reported in Table 2 above. The lapshear results of those specimens are given in FIGS. 10 and 11. Firstly, a 21.1% increase in bond strength, from 190 to 230 psi, is noted in the GFPP specimens by the mere inclusion of 30 weight percent of glass fiber component. This is likely the result of the substantial 3-5 fold increase in surface roughness for the glass-filled materials, as noted in the topography data of FIG. 4. The bond strength of the L30GFPP-a specimens that have been treated with the dosage "a" plasma treatment is further increased from 230 to 410 psi, or 78.3%. This 78.3% increase is at least five times the bond strength increase of 13.2% seen with the 000PP-a specimens reported in FIG. 8. In addition, the majority (mean of 87.4%) of the L30GFPP-a specimen lapshear fail cohesively (FIG. 11). Furthermore, in contrast to the 000PP-b specimens of FIGS. 8-9 where the dosage "b" air plasma treatment is shown to decrease bond strength as compared to the 000PP-0, the L30GFPP-b specimens elicit improved adhesion from 230 psi of without air plasma to 285 of the dosage "b" air plasma, or an increase of 23.9%. Albeit a reduced improvement compared to bond strength improvement with the dosage "a" air plasma, the 23.9% increase in bond strength elicited by the dosage "b" plasma on the L30GFPP-b specimens demonstrates that the inclusion of the glass fiber component in the GFPP specimens effectively compensates any adhesion loss elicited by a high dosage such as the dosage "b" air plasma. While not intended to be limited by any theory, one explanation is at least a portion of the glass fiber component is being exposed to the GFPP specimen surface by the air plasma treatment and presenting a mechanical linkage with the foam adhesive. This mechanical linkage or bond is simply not realized in the pure polypropylene specimens where no glass fiber component is present.

Figure 10:
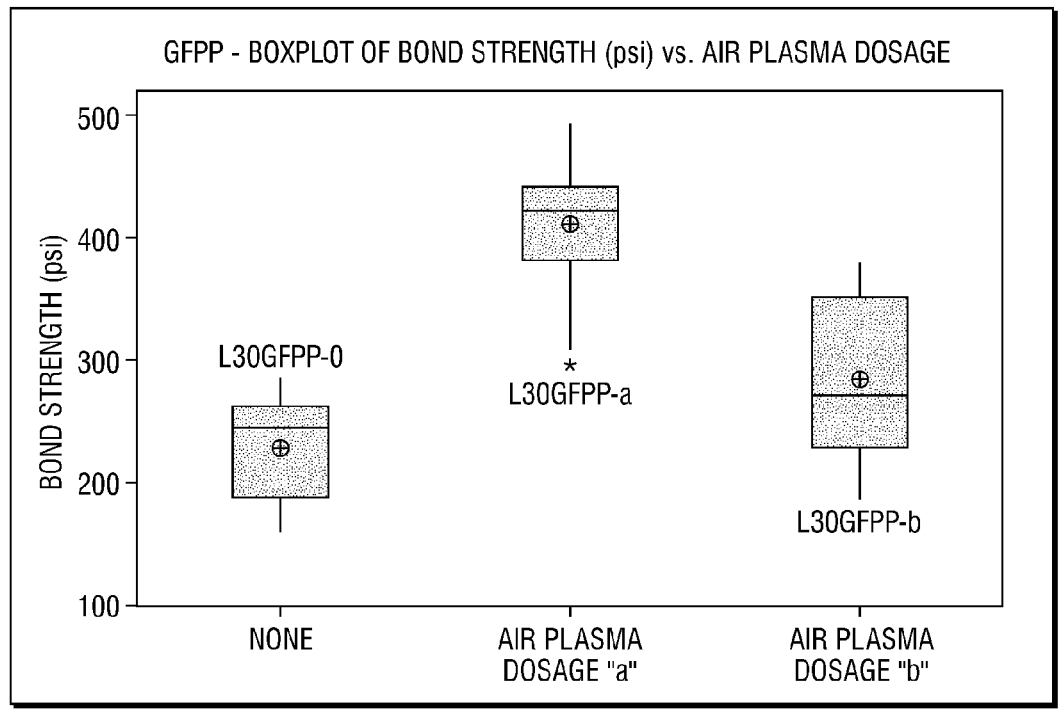
FIG. 10 depicts boxplots showing the mean and distribution of lapshear bond strength measurements (five replicates per group) of various GFPP specimens, without or with air plasma treatment at dosage "a" and dosage "b", respectively.
Figure 11:
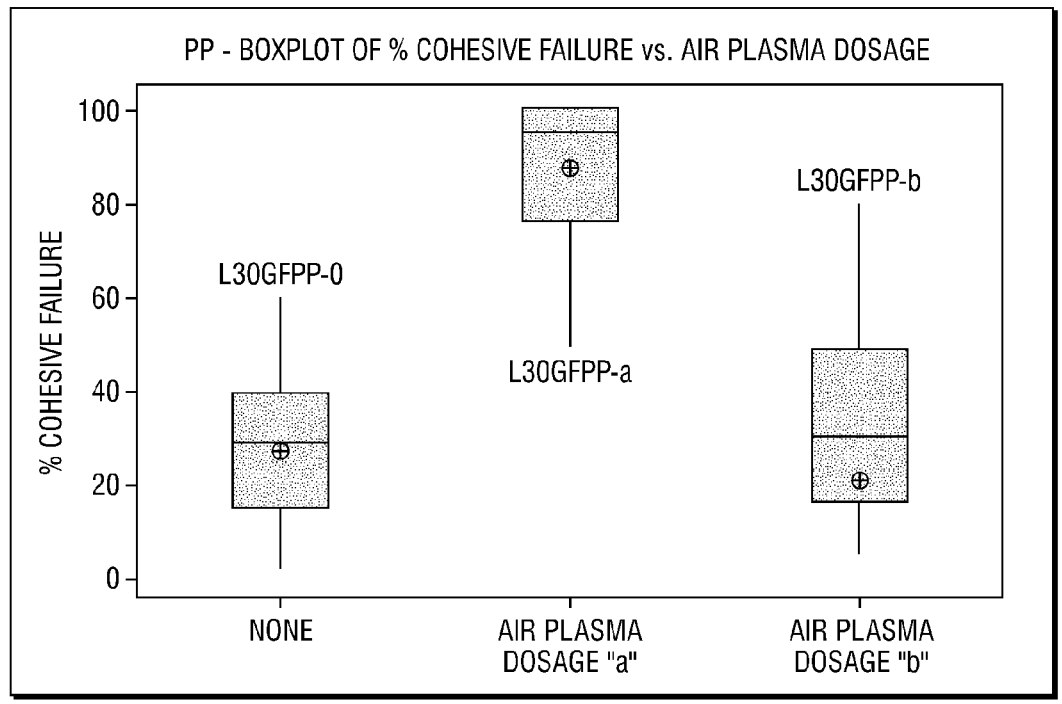
FIG. 11 depicts boxplots showing the mean and distribution of bond failure mode (five replicates per group) of various GFPP specimens, without or with air plasma treatment at dosage "a" and dosage "b", respectively.
Figure 12:
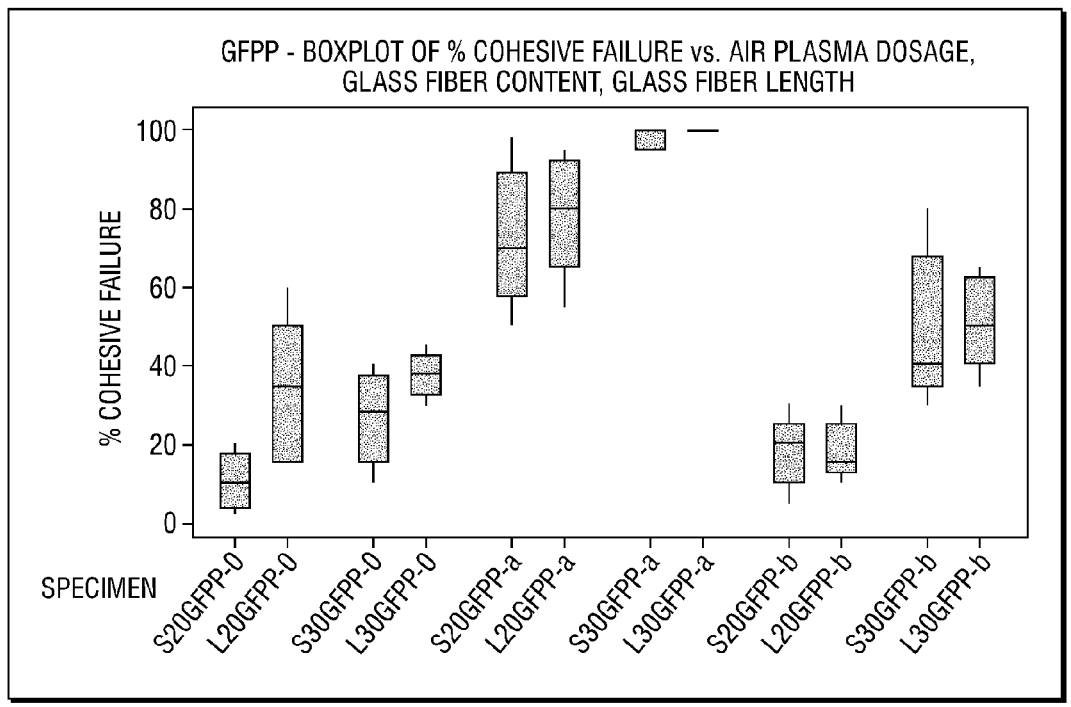
FIG. 12 depicts boxplots showing the mean and distribution of bond failure mode (five replicates per group) of various GFPP specimens, without or with air plasma treatment at dosage "a" and dosage "b", as a function of plasma dosage, glass fiber content, and glass fiber length.
Figure 13:
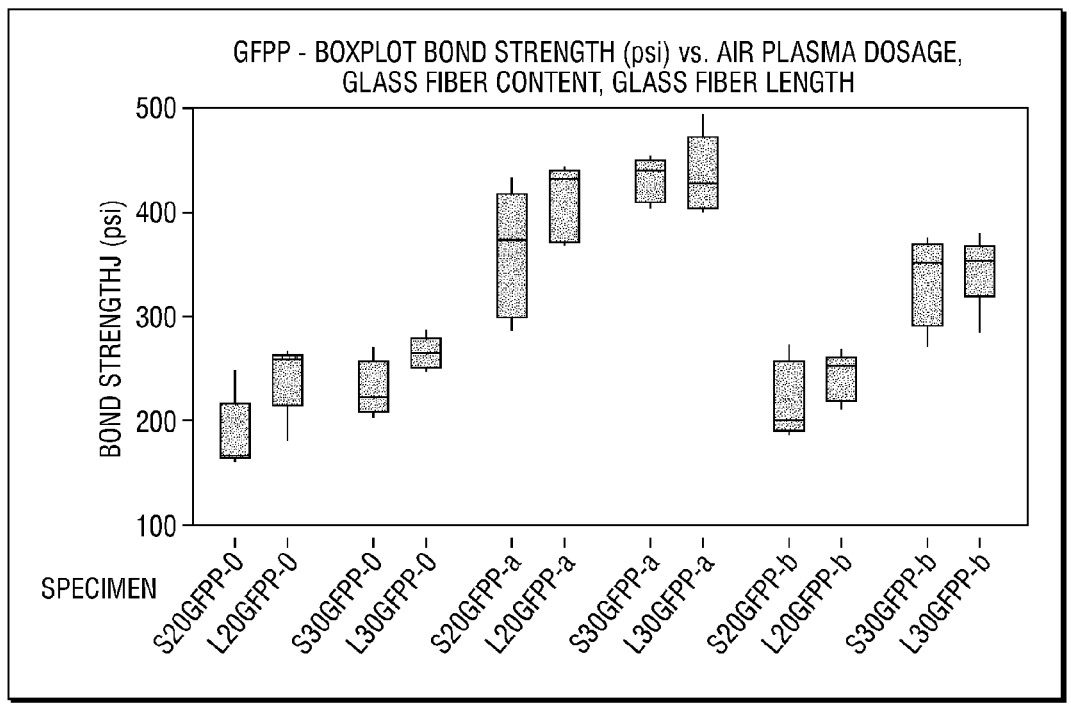
FIG. 13 depicts boxplots showing the mean and distribution of lapshear bond strength measurements (five replicates per group) of various GFPP specimens, without or with air plasma treatment at dosage "a" and dosage "b", as a function of plasma dosage, glass fiber content, and glass fiber length.

The same lapshear data from FIGS. 10 and 11 are alternatively presented in FIGS. 12 and 13 and the data is sorted by glass fiber length and content. The data shows patterns of changes based on dosages of air plasma treatment and substrate glass fiber content. As shown in the FIGS. 12 and 13, poorer adhesion is noticed with the L20GFPP-0 specimens and comparably better adhesion occurs with the L30GFPP-a specimens. In fact, this is the only specimen that exhibits 100% cohesive failure for all five coupons tested (FIG. 12). Although in general there is considerable variation in the data, it is still quite clear that better adhesion is realized with the specimens with higher glass fiber content.

Figure 14:
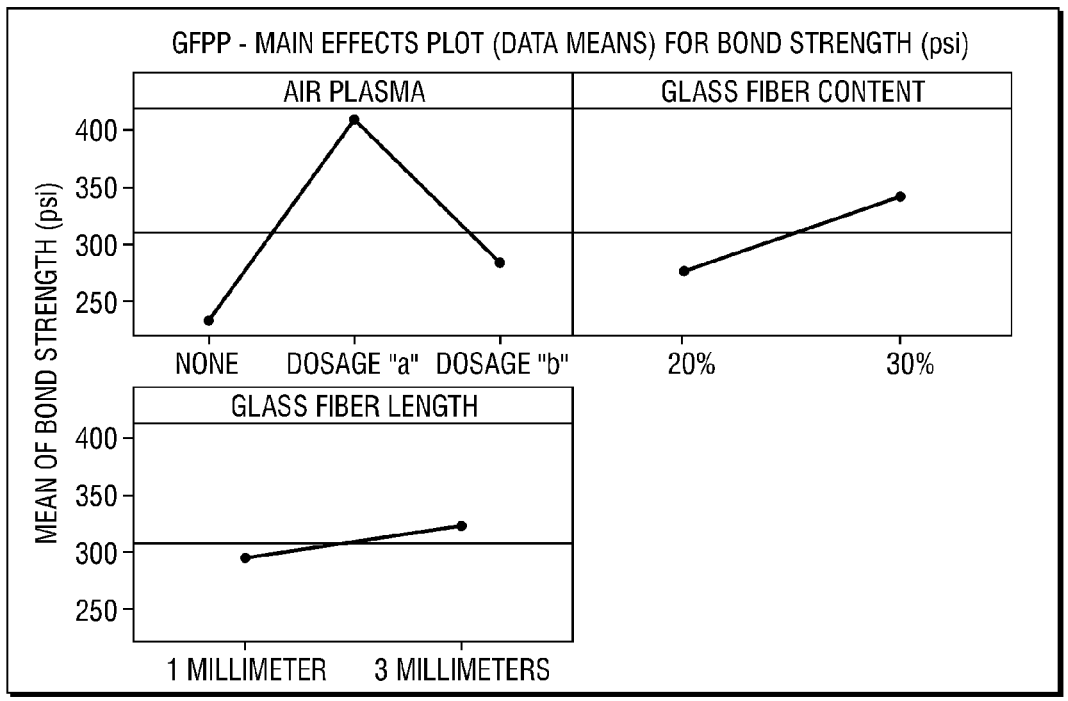
FIG. 14 depicts main effects plots for the response of bond strength, without or with air plasma treatment at dosage "a" or "b", as a function of the factors air plasma dosage, glass fiber content, and glass fiber length.
Figure 15:
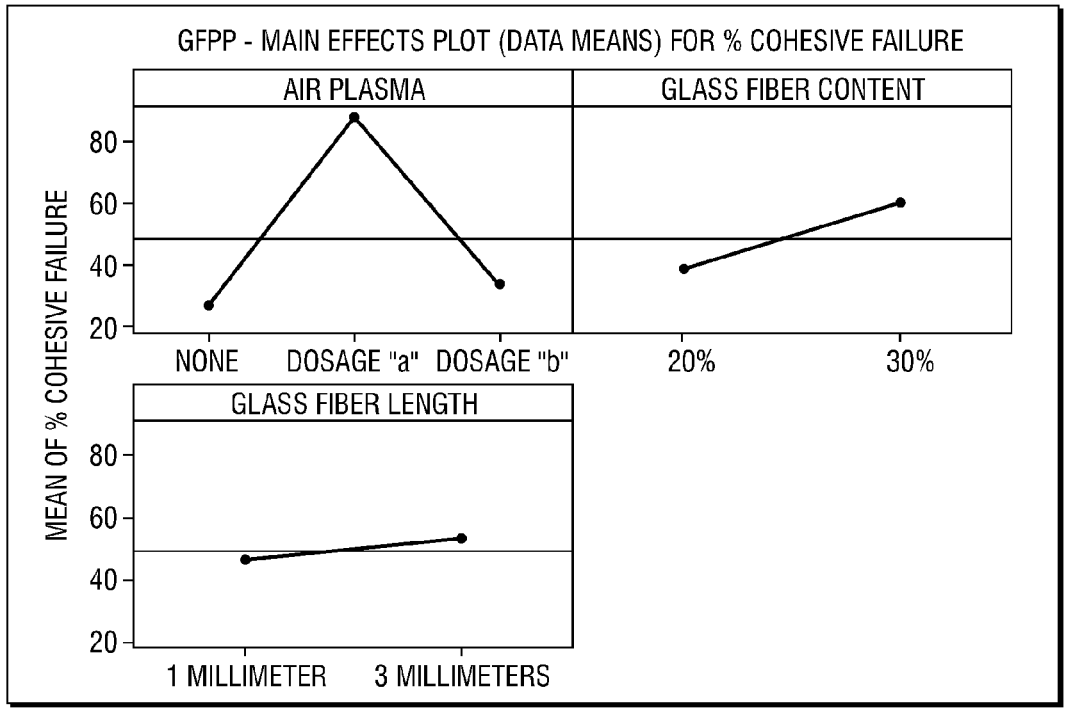
FIG. 15 depicts main effects plots for the response % cohesive failure, without or with air plasma treatment at dosage "a" or "b", as a function of the factors: air plasma dosage, glass fiber content, and glass fiber length.

The same data of FIGS. 12 and 13 are further alternatively represented by main effects plots depicted in FIGS. 14 and 15. It is demonstrated that air plasma dosage delivers the most significant impact, as compared to glass fiber content and mean glass fiber length, on adhesion with respect to both bond strength and failure mode. Low-dosage air plasma treatment imparts a dramatic increase in adhesion and the high plasma dosage treatment increases overall adhesion yet possibly with a lesser extent.

Figure 16:
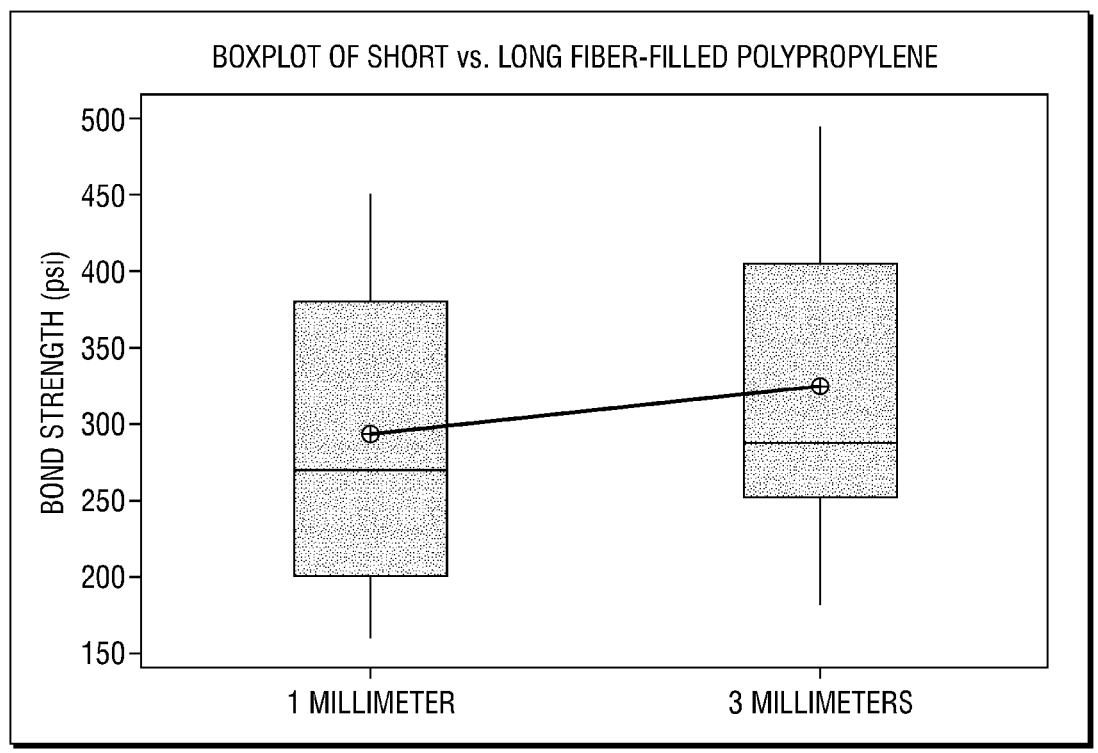
FIG. 16 depicts boxplots of lapshear bond strength of various GFPP lapshear specimens having either "short" mean fiber length or "long" mean fiber length.

The same bond strength data for the shorter fiber specimen group (collectively including S20GFPP-0, S30GFPP-0, S20GFPP-a, S30GFPP-a, S20GFPP-b, and S30GFPP-b) verse the longer fiber specimen group (collectively including L20GFPP-0, L30GFPP-0, L20GFPP-a, L30GFPP-a, L20GFPP-b, and L30GFPP-b) is further represented by boxplots in FIG. 16. A two-sample T-test is run on this data and it is demonstrated that the longer fiber specimen group appears to exhibit better adhesion than the shorter fiber specimen group with a 95% confidence of a statistical difference in data means between the groups.

Table 3 alternatively demonstrates differential bond strength results of FIG. 13 in response to the three test variables, namely air plasma dosage, mean fiber length, and glass fiber content. The bond strength enhancing effect of each variable is quantified and reported in Table 3. Between the pure polypropylene specimens with zero glass fiber content, the air plasma treatment at dosage "a" increase the lapshear bond strength by 25 psi from 190 (of the 000PP-0 specimens) to 215 psi (of the 000PP-a specimens), or an increase of 13.1%. A bond strength mean for the GFPP specimen group with no air plasma treatment (collectively including S20GFPP-0, S30GFPP-0, L20GFPP-0, and L30GFPP-0) is calculated to be 230 psi; a bond strength mean for the GFPP specimen group with dosage "a" air plasma treatment (collectively including S20GFPP-a, S30GFPP-a, L20GFPP-a, and L30GFPP-a) is 410 psi; and a bond strength mean for the GFPP specimen group with dosage "b" air plasma treatment (collectively including S20GFPP-b, S30GFPP-b, L20GFPP-b, and L30GFPP-b) is 285 psi. As such, the dosage "a" air plasma treatment elicits a bond strength enhancing effect with a change of 180 psi or 78.2% increase from the non-treated counterpart of 230 psi. The mere inclusion of glass fibers in the GFPP specimens greatly substantiates the impact of the air plasma treatment from rendering an increase of 13.1% to 78.2%, or an almost 6-fold. Upon the higher dosage "b" air plasma treatment, the mean bond strength of the pure polypropylene specimens is reduced by 33 psi while an increase of 55 psi is rather observed with the corresponding dosage "b" GFPP specimen group. In addition, the lower 20% (weight percent) glass fiber specimen group (collectively including S20GFPP-0, S20GFPP-a, S20GFPP-b, L20GFPP-0, L20GFPP-a, and L20GFPP-b) has a bond strength mean of 276 while the higher 30% (weight percent) glass fiber specimen group (collectively including S30GFPP-0, S30GFPP-a, S30GFPP-b, L30GFPP-0, L30GFPP-a, and L30GFPP-b) has a bond strength mean of 340. Furthermore, the shorter and longer fiber specimen groups as defined above have a bond strength mean of 293 psi and 323 psi, respectively. As such, a bond strength increase in the amount of 64 psi is observed with a fiber content change from 20% to 30% and an amount of 30 psi is observed with a mean fiber length change from 1 to 3 millimeters. It is therefore reasonably concluded that amongst the three tested variables, the air plasma treatment is the most significant contributor in enhancing the bond strength of the specimens tested here.

TABLE 3

Change in lapshear bond strength in response to various testing conditions
Change in Lapshear Bond Strength (psi)

| | Pure Polypropylene Specimens | | | Improvement | |
|---|---|---|---|---|---|
| | None | Dosage "a" | Dosage "b" | a | b |
| Air Plasma | 190 | 215 | 157 | 25 | −33 |

| | Glass Fiber Filled Polypropylene Specimens | | | Improvement | |
|---|---|---|---|---|---|
| | None | Dosage "a" | Dosage "b" | a | b |
| Air Plasma | 230 | 410 | 285 | 180 | 55 |

| | 20% | 30% | Improvement |
|---|---|---|---|
| Glass Fiber Content | 276 | 340 | 64 |

| | 1 millimeter | 3 millimeters | Improvement |
|---|---|---|---|
| Glass Fiber Length | 293 | 323 | 30 |

While the best mode for carrying out the invention has been described in detail, those familiar with the art to which this invention relates will recognize various alternative designs and embodiments for practicing the invention as defined by the following claims.

What is claimed:

1. A structural polymer insert comprising:
a substrate including polypropylene and glass fibers, the glass fibers forming about 30 weight percent of a total weight of the substrate and having a mean fiber length of about 3 millimeters, the substrate having an air plasma treated surface portion including a plurality of exposed glass fibers, silicon atoms of up to 5 atomic percent and oxygen atoms of 10 to 50 atomic percent of the total atoms present on the surface portion; and
an expandable foam adhesive chemically bonded to the surface portion to form a plurality of chemical bonds between the expandable foam adhesive and the surface portion and mechanically bonded to the plurality of exposed glass fibers to form a plurality of mechanical bonds between the expandable foam adhesive and the plurality of exposed glass fibers.

2. The structural polymer insert of claim 1, wherein the surface portion of the substrate includes one or more reactive moieties of hydroxyl, ether, ketone and carboxyl.

3. The structural polymer insert of claim 1, wherein the surface portion has one or more nitrogen atoms in an amount of 0.1 to 10 atomic percent of the total atoms present on the surface portion.

4. The structural polymer insert of claim 1, wherein the surface portion has an oxygen-to-nitrogen atomic ratio of 5.0 to 12.0.

5. The structural polymer insert of claim 1, wherein the expandable foam adhesive has a volume expansion of 150 to 450 percent.

6. The structural polymer insert of claim 5, wherein the expandable foam adhesive is epoxy based.

7. The structural polymer insert of claim 1, further comprising an outer layer contacting the substrate to provide added structural durability.

8. The structural polymer insert of claim 1, wherein the plurality of exposed glass fibers are localized up to 80 μm deep from the air plasma treated surface portion.

9. A structural polymer insert comprising:
a substrate including polypropylene and glass fibers, the glass fibers forming about 30 weight percent of a total weight of the substrate and having a mean fiber length of about 3 millimeters, the substrate having an air plasma treated surface portion including a plurality of exposed glass fibers and oxygen atoms of 26.7 to 32.8 atomic percent of the total atoms present on the surface portion; and
an expandable foam adhesive chemically bonded to the surface portion to form a plurality of chemical bonds between the expandable foam adhesive and the surface portion and mechanically bonded to the plurality of exposed glass fibers to form a plurality of mechanical bonds between the expandable foam adhesive and the plurality of exposed glass fibers.

10. A structural polymer insert comprising:
a substrate including polypropylene and glass fibers, the glass fibers forming about 30 weight percent of a total weight of the substrate and having a mean fiber length of about 3 millimeters, the substrate having an air plasma treated surface portion including a plurality of exposed glass fibers and nitrogen atoms of 3.3 to 4.4 atomic percent of the total atoms present on the surface portion; and
an expandable foam adhesive chemically bonded to the surface portion to form a plurality of chemical bonds between the expandable foam adhesive and the surface portion and mechanically bonded to the plurality of exposed glass fibers to form a plurality of mechanical bonds between the expandable foam adhesive and the plurality of exposed glass fibers.

* * * * *